United States Patent
Niedzwiecki et al.

(10) Patent No.: US 9,140,501 B2
(45) Date of Patent: Sep. 22, 2015

(54) BATTERY MODULE HAVING A RUBBER COOLING MANIFOLD

(75) Inventors: Mark Niedzwiecki, Troy, MI (US); William Koetting, Davisburg, MI (US); Josh Payne, Royal Oak, MI (US); Igor Isayev, Berkley, MI (US); Venkatachala Moorthi Natarajan, Largo, FL (US)

(73) Assignee: LG Chem, Ltd., Seoul (KR)

( * ) Notice: Subject to any disclaimer, the term of this patent is extended or adjusted under 35 U.S.C. 154(b) by 1445 days.

(21) Appl. No.: 12/164,445

(22) Filed: Jun. 30, 2008

(65) Prior Publication Data

US 2009/0325051 A1 Dec. 31, 2009

(51) Int. Cl.
*H01M 10/655* (2014.01)
*F28F 9/02* (2006.01)
*F28F 21/06* (2006.01)
*H01M 10/6567* (2014.01)
*H01M 10/6566* (2014.01)
*H01M 10/613* (2014.01)
*H01M 10/647* (2014.01)
(Continued)

(52) U.S. Cl.
CPC ............. *F28F 9/0275* (2013.01); *F28F 21/067* (2013.01); *H01M 10/613* (2015.04); *H01M 10/6566* (2015.04); *H01M 10/6567* (2015.04); *H01M 10/647* (2015.04); *H01M 10/6557* (2015.04); *H01M 10/6568* (2015.04)

(58) Field of Classification Search
None
See application file for complete search history.

(56) References Cited

U.S. PATENT DOCUMENTS 3,964,930 A * 6/1976 Reiser ........................... 429/435
4,390,841 A   6/1983 Martin et al.
(Continued)

FOREIGN PATENT DOCUMENTS

CN   1385917 A   12/2002
CN   101101997 A   1/2008
(Continued)

OTHER PUBLICATIONS

U.S. Appl. No. 12/164,780, filed Jun. 30, 2008 entitled Battery Module Having Battery Cell Assembly with Heat Exchanger.
(Continued)

*Primary Examiner* — Maria J Laios
(74) *Attorney, Agent, or Firm* — Buckert Patent & Trademark Law Firm, PC; John F. Buckert

(57) ABSTRACT

A battery module is provided. The battery module includes a plurality of battery cell assemblies having a plurality of heat exchangers therein. The battery module includes a first rubber cooling manifold configured to route a fluid into the plurality of heat exchangers. The first rubber cooling manifold has a first tubular member, a first inlet port, a first plurality of outlet ports, and first and second end caps. The first end cap is coupled to a first end of the first tubular member. The second end cap is coupled to a second end of the first tubular member. The first inlet port is disposed on a top portion of the first tubular member for routing the fluid into the first tubular member. The first plurality of outlet ports is disposed collinearly and longitudinally along an outer surface of the first tubular member and spaced apart from one another. The first plurality of outlet ports extend outwardly from the outer surface of the first tubular member. The first plurality of outlet ports route the fluid from the first tubular member into the plurality of heat exchangers for cooling the plurality of battery cell assemblies.

17 Claims, 7 Drawing Sheets

(51) Int. Cl.
*H01M 10/6568* (2014.01)
*H01M 10/6557* (2014.01)

(56) References Cited

U.S. PATENT DOCUMENTS

| | | | |
|---|---|---|---|
| 5,392,873 | A | 2/1995 | Masuyama et al. |
| 5,606,242 | A | 2/1997 | Hull et al. |
| 5,652,502 | A | 7/1997 | Van Phuoc et al. |
| 5,658,682 | A | 8/1997 | Usuda et al. |
| 5,796,239 | A | 8/1998 | Van Phuoc et al. |
| 5,825,155 | A | 10/1998 | Ito et al. |
| 5,982,403 | A | 11/1999 | Inagaki |
| 6,016,047 | A | 1/2000 | Notten et al. |
| 6,159,630 | A | 12/2000 | Wyser |
| 6,289,979 | B1 * | 9/2001 | Kato ............................ 165/173 |
| 6,353,815 | B1 | 3/2002 | Vilim et al. |
| 6,362,598 | B2 | 3/2002 | Laig-Horstebrock et al. |
| 6,441,586 | B1 | 8/2002 | Tate, Jr. et al. |
| 6,515,454 | B2 | 2/2003 | Schoch |
| 6,534,954 | B1 | 3/2003 | Plett |
| 6,563,318 | B2 | 5/2003 | Kawakami et al. |
| 6,724,172 | B2 | 4/2004 | Koo |
| 6,821,671 | B2 | 11/2004 | Hinton et al. |
| 6,829,562 | B2 | 12/2004 | Sarfert |
| 6,832,171 | B2 | 12/2004 | Barsoukov et al. |
| 6,876,175 | B2 | 4/2005 | Schoch |
| 6,892,148 | B2 | 5/2005 | Barsoukov et al. |
| 6,927,554 | B2 | 8/2005 | Tate, Jr. et al. |
| 6,943,528 | B2 | 9/2005 | Scoch |
| 6,967,466 | B2 | 11/2005 | Koch |
| 7,012,434 | B2 | 3/2006 | Koch |
| 7,039,534 | B1 | 5/2006 | Ryno et al. |
| 7,061,246 | B2 | 6/2006 | Dougherty et al. |
| 7,072,871 | B1 | 7/2006 | Tinnemeyer |
| 7,098,665 | B2 | 8/2006 | Laig-Hoerstebrock |
| 7,109,685 | B2 | 9/2006 | Tate, Jr. et al. |
| 7,126,312 | B2 | 10/2006 | Moore |
| 7,197,487 | B2 | 3/2007 | Hansen et al. |
| 7,199,557 | B2 | 4/2007 | Anbuky et al. |
| 7,250,741 | B2 | 7/2007 | Koo et al. |
| 7,253,587 | B2 | 8/2007 | Meissner |
| 7,315,789 | B2 | 1/2008 | Plett |
| 7,321,220 | B2 | 1/2008 | Plett |
| 7,327,147 | B2 | 2/2008 | Koch |
| 7,591,303 | B2 | 9/2009 | Zeigler et al. |
| 8,011,467 | B2 | 9/2011 | Asao et al. |
| 8,663,829 | B2 | 3/2014 | Koetting et al. |
| 2002/0012833 | A1 | 1/2002 | Gow et al. |
| 2002/0086201 | A1 | 7/2002 | Payen et al. |
| 2003/0017384 | A1 | 1/2003 | Marukawa et al. |
| 2003/0184307 | A1 | 10/2003 | Kozlowski et al. |
| 2003/0189104 | A1 | 10/2003 | Watanabe et al. |
| 2004/0121205 | A1 | 6/2004 | Blanchet |
| 2005/0100786 | A1 | 5/2005 | Ryu et al. |
| 2005/0127874 | A1 | 6/2005 | Lim et al. |
| 2005/0194936 | A1 | 9/2005 | Cho |
| 2006/0097698 | A1 | 5/2006 | Plett |
| 2006/0100833 | A1 | 5/2006 | Plett |
| 2006/0111854 | A1 | 5/2006 | Plett |
| 2006/0111870 | A1 | 5/2006 | Plett |
| 2007/0035307 | A1 | 2/2007 | Scoch |
| 2007/0046292 | A1 | 3/2007 | Plett |
| 2007/0103120 | A1 | 5/2007 | Plett |
| 2007/0120533 | A1 | 5/2007 | Plett |
| 2007/0188143 | A1 | 8/2007 | Plett |
| 2007/0236182 | A1 | 10/2007 | Plett |
| 2008/0094035 | A1 | 4/2008 | Plett |
| 2008/0110606 | A1 | 5/2008 | Gorbounov et al. |
| 2008/0182151 | A1 * | 7/2008 | Mizusaki et al. ............... 429/34 |
| 2008/0299446 | A1 * | 12/2008 | Kelly ............................ 429/88 |
| 2009/0123819 | A1 | 5/2009 | Kim |
| 2009/0325059 | A1 | 12/2009 | Niedzwiecki et al. |
| 2010/0304203 | A1 | 12/2010 | Buck et al. |
| 2010/0307723 | A1 | 12/2010 | Thomas et al. |
| 2011/0000241 | A1 | 1/2011 | Favaretto |
| 2011/0020676 | A1 | 1/2011 | Kurosawa |
| 2011/0027631 | A1 | 2/2011 | Koenigsmann |
| 2011/0045326 | A1 | 2/2011 | Leuthner et al. |
| 2011/0052960 | A1 | 3/2011 | Kwon et al. |
| 2011/0189523 | A1 | 8/2011 | Eom |
| 2011/0293982 | A1 | 12/2011 | Martz et al. |
| 2011/0293983 | A1 | 12/2011 | Oury et al. |
| 2012/0156542 | A1 | 6/2012 | Schaefer et al. |
| 2012/0171543 | A1 | 7/2012 | Hirsch et al. |
| 2012/0183830 | A1 | 7/2012 | Schaefer et al. |
| 2013/0045410 | A1 | 2/2013 | Yang et al. |
| 2013/0136136 | A1 | 5/2013 | Ando et al. |
| 2014/0120390 | A1 | 5/2014 | Merriman et al. |
| 2014/0147709 | A1 | 5/2014 | Ketkar et al. |
| 2014/0227575 | A1 | 8/2014 | Ketkar |
| 2014/0308558 | A1 | 10/2014 | Merriman et al. |
| 2015/0010801 | A1 | 1/2015 | Arena et al. |

FOREIGN PATENT DOCUMENTS

| | | |
|---|---|---|
| CN | 1754279 B | 9/2010 |
| DE | 102008034860 A1 | 1/2010 |
| DE | 102009006426 A1 | 7/2010 |
| DE | 102010021922 A1 | 12/2011 |
| EP | 2065963 A2 | 6/2009 |
| EP | 2200109 A2 | 6/2010 |
| JP | 19970199186 | 7/1997 |
| JP | 2006512731 | 4/2006 |
| JP | 2006125835 | 5/2006 |
| JP | 2007107684 | 4/2007 |
| KR | 20090107443 A | 10/2009 |
| KR | 20100119497 A | 9/2010 |
| KR | 20100119498 A | 9/2010 |
| KR | 20110013269 | 2/2011 |
| KR | 1020110013270 A | 2/2011 |
| KR | 20110126764 A | 11/2011 |
| WO | 2006083446 A2 | 8/2006 |
| WO | 2011145830 A2 | 11/2011 |

OTHER PUBLICATIONS

U.S. Appl. No. 12/165,100, filed Jun. 30, 2008 entitled Battery Cell Assembly Having Heat Exchanger With Serpentine Flow Path.
U.S. Appl. No. 12/016,630, filed Jan. 18, 2008 entitled Battery Cell Assembly and Method for Assembling the Battery Cell Assembly.
U.S. Appl. No. 11/828,927, filed Jul. 26, 2007 entitled Battery Cell Carrier Assembly Having a Battery Cell Carrier for Holding a Battery Cell Therein.
U.S. Appl. No. 12/164,741, filed Jun. 30, 2008 entitled Battery Module Having Battery Cell Assemblies with Alignment-Coupling Features.
U.S. Appl. No. 12/164,627, filed Jun. 30, 2008 entitled Battery Module Having Cooling Manifold and Method for Cooling Battery Module.
International Search Report for International application No. PCT/KR2013/004015 dated Sep. 26, 2013.
U.S. Appl. No. 14/273,572, filed May 9, 2014 entitled Battery Pack and Method of Assembling the Battery Pack.
U.S. Appl. No. 14/273,586, filed May 9, 2014 entitled Battery Module and Method of Assembling the Battery Module.
U.S. Appl. No. 14/328,000, filed Jul. 10, 2014 entitled Battery System and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
U.S. Appl. No. 14/516,667, filed Oct. 17, 2014 entitled Battery Cell Assembly.
U.S. Appl. No. 14/531,696, filed Nov. 3, 2014 entitled Battery Pack.
Written Opinion for International application No. PCT/KR2013002597 dated Feb. 2, 2015.
Written Opinion for International application No. PCT/KR2014/002090 dated May 26, 2014.

* cited by examiner

BATTERY MODULE HAVING A RUBBER COOLING MANIFOLD

TECHNICAL FIELD

This application relates generally to a battery module having a rubber cooling manifold.

BACKGROUND OF THE INVENTION

Battery packs generate heat during usage. To prevent degradation of the battery packs, the battery packs should be cooled.

The inventors herein have recognized that heat exchangers disposed in battery cell assemblies should be utilized to cool the battery cell assemblies. Further, the inventors herein have recognized that a flexible cooling manifold configured to supply fluid to the heat exchangers should be utilized to effectively couple to the heat exchangers.

SUMMARY OF THE INVENTION

A battery module in accordance with an exemplary embodiment is provided. The battery module includes a plurality of battery cell assemblies having a plurality of heat exchangers therein. The battery module includes a first rubber cooling manifold configured to route a fluid into the plurality of heat exchangers. The first rubber cooling manifold has a first tubular member, a first inlet port, a first plurality of outlet ports, and first and second end caps. The first end cap is coupled to a first end of the first tubular member. The second end cap is coupled to a second end of the first tubular member. The first inlet port is disposed on a top portion of the first tubular member for routing the fluid into the first tubular member. The first plurality of outlet ports is disposed collinearly and longitudinally along an outer surface of the first tubular member and spaced apart from one another. The first plurality of outlet ports extend outwardly from the outer surface of the first tubular member. The first plurality of outlet ports route the fluid from the first tubular member into the plurality of heat exchangers for cooling the plurality of battery cell assemblies.

DETAILED DESCRIPTION OF AN EXEMPLARY EMBODIMENT

Figure 1:
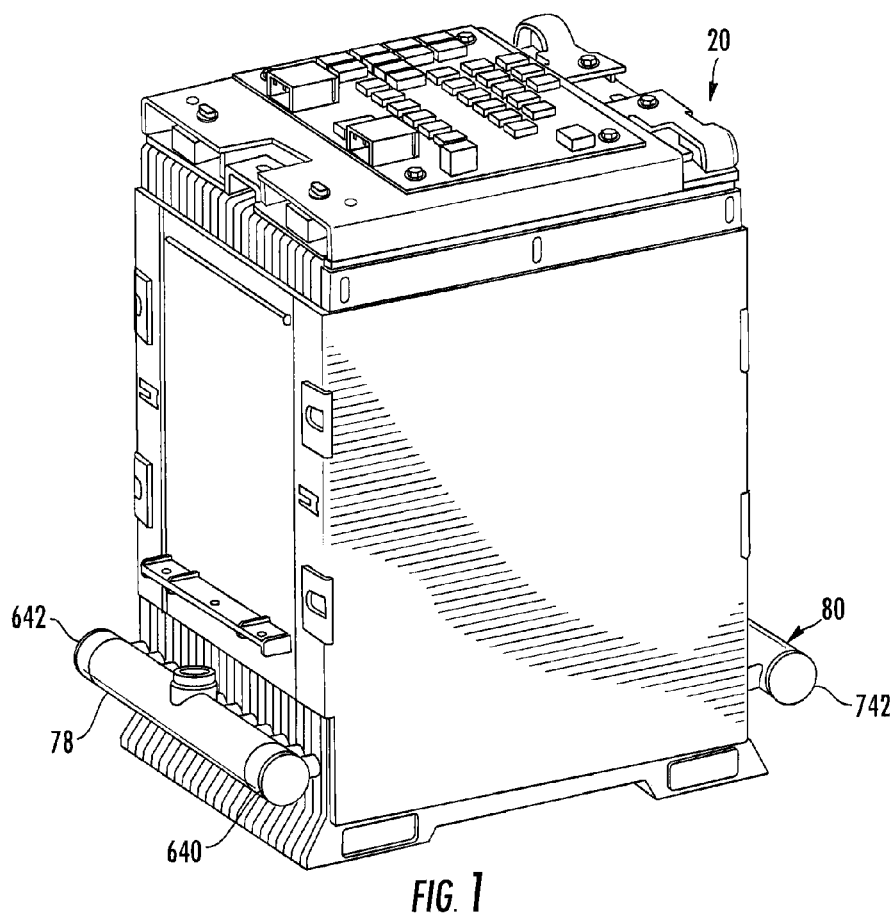
FIG. 1 is a schematic of a battery module in accordance with an exemplary embodiment.
Figure 2:
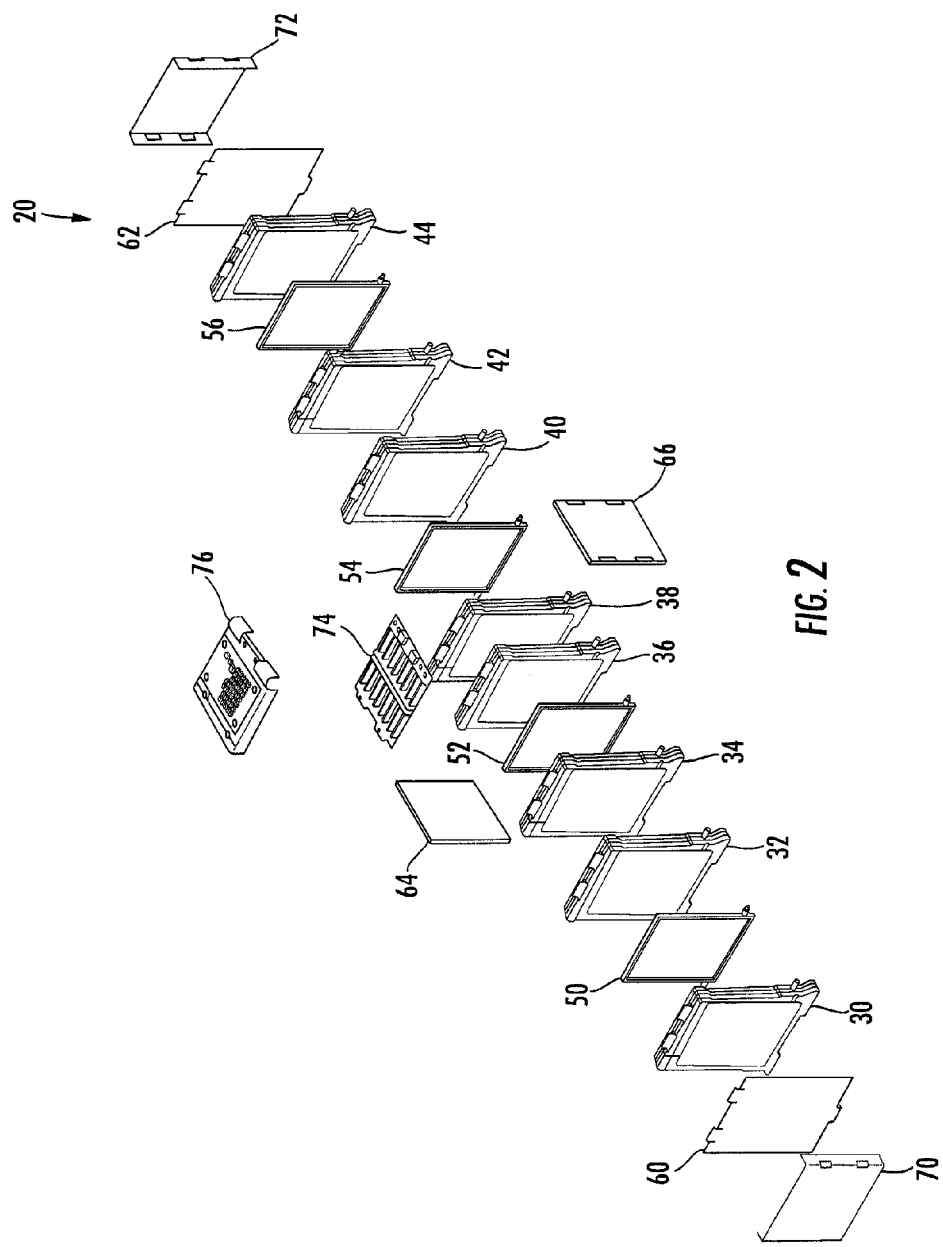
FIG. 2 is an exploded schematic of a portion of the battery module of FIG. 1.

Referring to FIGS. 1 and 2, a battery module 20 for providing electrical power is provided. The battery module 20 includes battery cell assemblies 30, 32, 34, 36, 38, 40, 42, 44, heat exchangers 50, 52, 54, 56, side plates 60, 62, 64, 66, coupling plates 70, 72, an interconnect assembly 74, a cover 76, and cooling manifolds 78, 80. A battery cell assembly is defined as a housing having a battery cell therein. A battery module is defined as at least two battery cell assemblies coupled together.

The battery cell assemblies 30, 32, 34, 36, 38, 40, 42, 44 are electrically coupled together utilizing the interconnect assembly 74. In particular, the interconnect assembly 74 electrically couples together electrical terminals from the battery cell assemblies in a desired configuration to provide an electrical current and voltage therefrom.

The heat exchangers 50, 52, 54, 56 receive a fluid from the cooling manifold 78 to cool the battery cell assemblies. The heated fluid from the heat exchangers 50, 52, 54, 56 is received by the cooling manifold 80.

The side plates 60, 62, 64, 66 are coupled to the battery cell assemblies to provide additional support for the battery cell assemblies. The coupling plates 70, 72 are provided to engage the side plates 64, 66 to provide additional support for the battery cell assemblies. The cover plate 76 is provided to cover the interconnect assembly 74.

Figure 3:
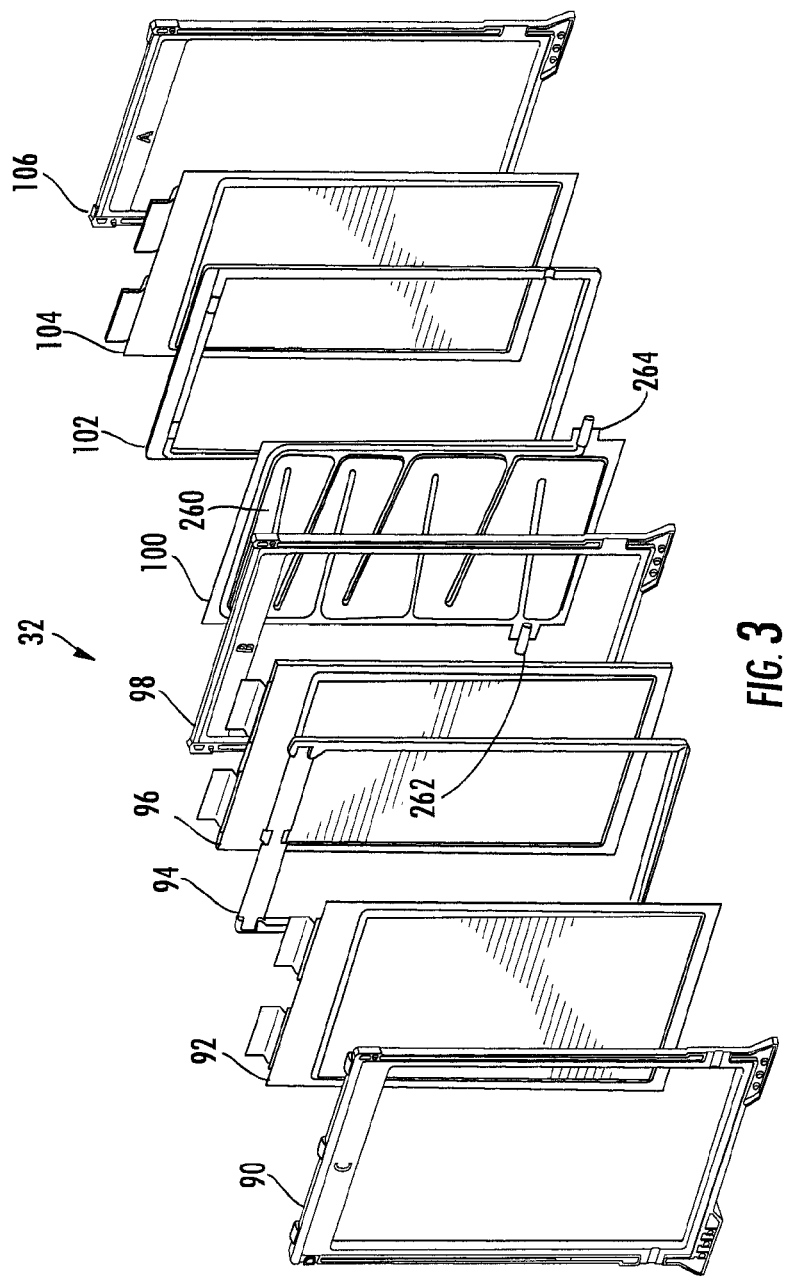
FIG. 3 is an exploded schematic of a battery cell assembly utilized in the battery module of FIG. 2.

Referring to FIG. 3, a battery cell assembly 32 in accordance with an exemplary embodiment that is utilized in the battery module 20 will be explained. The battery cell assembly 32 includes a rectangular ring-shaped frame member 90, a battery cell 92, a securement ring-shaped member 94, a battery cell 96, a rectangular ring-shaped frame member 98, a heat exchanger 100, a securement ring-shaped member 102, a battery cell 104, and a rectangular ring-shaped frame member 106. An advantage of the battery cell assembly 32 is that the assembly 32 is packaged such that a heat exchanger 100 can cool the battery cells 92, 96, 104 to maintain the battery cells at a desired temperature.

The rectangular ring-shaped frame member 90 is configured to be coupled to the rectangular ring-shaped frame member 98 for holding the battery cell 92, the securement ring-shaped member 94, and the battery cell 96 therebetween.

The battery cell 92 is provided to output an operational voltage between the electrical terminals 164, 166. The battery cell 92 includes a body portion and a peripheral lip portion extending around the body portion, and electrical terminals extending from the body portion. The battery cell 92 is disposed between the frame member 90 and a portion of the securement ring-shaped member 94 and the battery cell 96.

The securement ring-shaped member 94 is provided to further secure the battery cells 92, 96 between the rectangular ring-shaped members 90, 98. The securement ring-shaped member 94 is disposed between the peripheral lip portions of the battery cells 92, 96 to further support the battery cells 92, 96.

The battery cell 96 is disposed between the rectangular ring-shaped frame member 98 and both a portion of the battery cell 92 and the securement ring-shaped member 94. The structure of the battery cell 96 is substantially similar to the battery cell 92.

The rectangular ring-shaped frame member 98 is configured to be coupled to the rectangular ring-shaped frame member 90 for holding the battery cell 92, the securement ring-shaped member 94, and the battery cell 96 therebetween. Further, the rectangular ring-shaped frame member 98 is provided to couple to the rectangular ring-shaped frame member 106 for holding the heat exchanger 100, the securement ring-shaped member 102, and the battery cell 104 therebetween.

The heat exchanger 100 is configured to cool the battery cells 92, 96 and 104 to maintain the battery cells at a desired temperature. The heat exchanger 100 is disposed between (i) a portion of the battery cell 96 and the rectangular ring-shaped frame member 98, and (ii) a portion of the battery cell 104 and the securement ring-shaped member 102. The heat exchanger 100 includes a housing 260, an inlet port 262, and an outlet port 264. While flowing through the heat exchanger 100, the fluid extracts heat energy from the battery cells 92, 96, 104 to cool the battery cells. From the outlet port 264, the heated fluid flows to the cooling manifold 80.

The securement ring-shaped member 102 is provided to further secure the heat exchanger 100 and the battery cell 104 between the rectangular ring-shaped members 90, 106. The securement ring-shaped member 102 is disposed between the rectangular ring-shaped frame member 98 and a peripheral lip portion of the battery cell 104.

The battery cell 104 is disposed between the rectangular ring-shaped frame member 106 and both a portion of the heat exchanger 100 and the securement ring-shaped member 102. The structure of the battery cell 104 is substantially similar to the battery cell 92.

The rectangular ring-shaped frame member 106 is configured to be coupled to the rectangular ring-shaped frame member 98 for holding the heat exchanger 100, the securement ring-shaped member 102, and the battery cell 104 therebetween.

Referring to FIGS. 1, 4, 5 and 7, the cooling manifold 78 will be explained in further detail. In particular, the cooling manifold 78 is configured to route a fluid to inlet ports on the heat exchangers 50, 52, 54, 56 and to the heat exchangers in the battery cell assemblies 30, 32, 34, 36, 40, 42, 44 for cooling the battery cell assemblies in the battery module 20. In one exemplary embodiment, the cooling manifold 78 is constructed from rubber. The cooling manifold 78 includes a tubular member 600, an inlet port 602, outlet ports 604, 606, 608, 610, 612, 614, 616, 618, 620, 622, 624, 626, 628, 630, 632, and end caps 640, 642.

The inlet port 602 is provided to route fluid from a fluid reservoir 812 into the tubular member 600. The inlet port 602 is disposed on a top portion of the tubular member 600.

The tubular member 600 receives the fluid from the inlet port 602 and routes the fluid to the outlet ports 604, 606, 608, 610, 612, 614, 616, 618, 620, 622, 624, 626, 628, 630, 632. The end cap 640 is disposed at a first end of the tubular member 600. The end cap 642 is disposed at a second of the tubular member 600.

Figure 4:
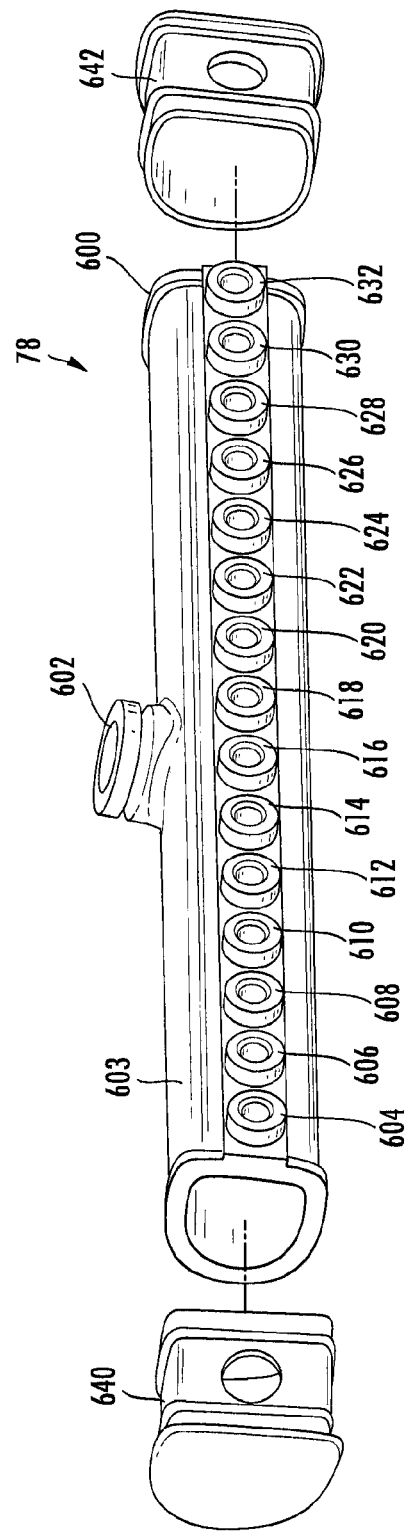
FIG. 4 is a schematic of a cooling manifold in accordance with another exemplary embodiment utilized in the battery module of FIG. 1.
Figure 5:
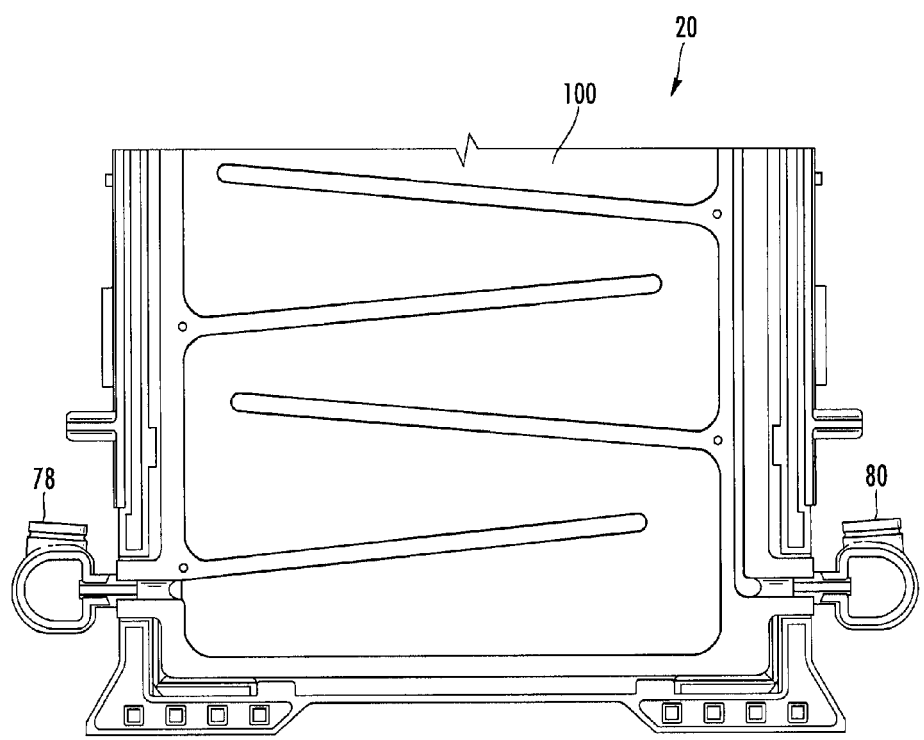
FIG. 5 is a cross-sectional schematic of a portion of the battery module of FIG. 1 illustrating first and second cooling manifolds in accordance with another exemplary embodiment.
Figure 6:
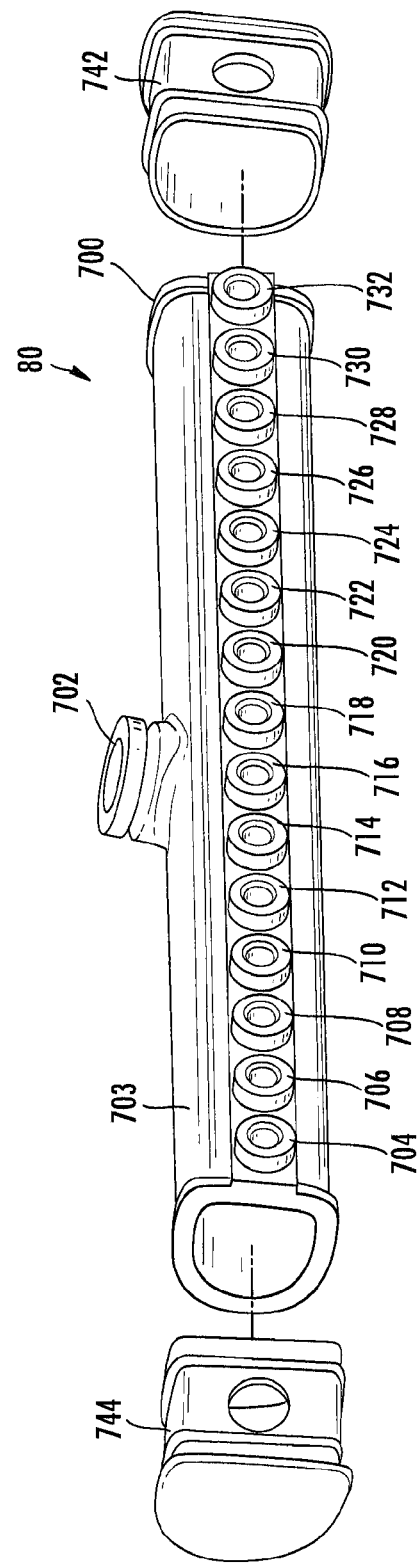
FIG. 6 is a schematic of another cooling manifold in accordance with another exemplary embodiment utilized in the battery module of FIG. 1.
Figure 7:
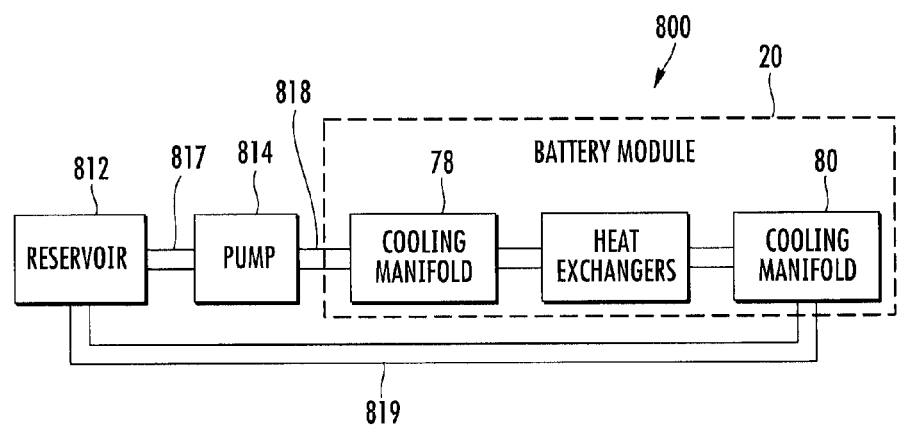
FIG. 7 is a schematic of a system for cooling the battery module of FIG. 1.

Referring to FIGS. 2 and 4, the outlet ports 604, 606, 608, 610, 612, 614, 616, 618, 620, 622, 624, 626, 628, 630, 632 are disposed collinearly and longitudinally along the outer surface 603 of the tubular member 600 and are spaced apart from one another. Further, the outlet ports 604, 606, 608, 610, 612, 614, 616, 618, 620, 622, 624, 626, 628, 630, 632 extend outwardly from the outer surface 603 of the tubular member 600. The outlet ports 604, 606, 608, 610, 612, 614, 616, 618, 620, 622, 624, 626, 628, 630, 632 route the fluid to inlet ports of the heat exchangers 50, 52, 54, 56 and to the heat exchangers in the battery cell assemblies 30, 32, 34, 36, 40, 42, 44.

Referring to FIGS. 1, 2, 5, 6 and 7, the cooling manifold 80 will now be explained in further detail. In particular, the cooling manifold 80 is configured to receive fluid from the heat exchangers 50, 52, 54, 56 and from the heat exchangers in the battery cell assemblies 30, 32, 34, 36, 40, 42, 44. In one exemplary embodiment, the cooling manifold 80 is constructed from rubber. The cooling manifold 80 includes a tubular member 700, an outlet port 702, inlet ports 704, 706, 708, 710, 712, 714, 716, 718, 720, 722, 724, 726, 728, 730, 732, and end caps 742, 744.

The inlet ports 704, 706, 708, 710, 712, 714, 716, 718, 720, 722, 724, 726, 728, 730, 732 are disposed collinearly and longitudinally along the outer surface 703 of the tubular member 700 and are spaced apart from one another. Further, the inlet ports 704, 706, 708, 710, 712, 714, 716, 718, 720, 722, 724, 726, 728, 730, 732 extend outwardly from the outer surface 703 of the tubular member 700. The inlet ports 704, 706, 708, 710, 712, 714, 716, 718, 720, 722, 724, 726, 728, 730, 732 receive the fluid from the heat exchangers 50, 52, 54, 56 and the heat exchangers in the battery cell assemblies 30, 32, 34, 36, 40, 42, 44 and route the fluid to the tubular member 700.

The tubular member 700 receives the fluid from the inlet ports 704, 706, 708, 710, 712, 714, 716, 718, 720, 722, 724, 726, 728, 730, 732 and routes the fluid to the outlet port 702. The outlet port 702 is disposed on the top portion of the tubular member 700 and routes the fluid from the tubular member 700 to the reservoir 812. The end cap 742 is disposed at a first end of the tubular member 700. The end cap 744 is disposed at a second of a tubular member 700.

Referring to FIGS. 2, 4, 6 and 7, a system 800 for cooling the battery module 20 is illustrated. The system 800 includes a reservoir 812, a pump 814, and conduits 817, 818 and 819. The reservoir 812 holds a fluid therein. The pump 814 pumps the fluid from the reservoir 812 via the conduit 817 in the pump 814. Thereafter, the pump 814 pumps the fluid through the conduit 818 into the inlet port 602 of the cooling manifold 70. The cooling manifold 70 routes the fluid through the tubular member 700 to the outlet ports 604, 606, 608, 610, 612, 614, 616, 618, 620, 622, 624, 626, 628, 630, 632. The outlet ports 604, 606, 608, 610, 612, 614, 616, 618, 620, 622, 624, 626, 628, 630, 632 route the fluid into both the inlet ports of the heat exchangers 50, 52, 54, 56 and into the inlet ports of the heat exchangers in the battery cell assemblies 30, 32, 34, 36, 40, 42, 44. After extracting heat energy from the battery cell assemblies, the heat exchangers route the fluid into the inlet ports 704, 706, 708, 710, 712, 714, 716, 718, 720, 722, 724, 726, 728, 730, 732 of the cooling manifold 80. The cooling manifold 80 routes the fluid through tubular member 700 to the outlet port 702. The outlet port 702 routes the fluid through the conduit 819 back to the reservoir 812.

The battery module 20 having cooling manifolds 78, 80 provide a substantial advantage over other battery systems. In particular, the battery module has cooling manifolds constructed from rubber that provides a technical effect of allowing the cooling manifolds to be readily coupled to heat exchangers in the battery cell assemblies within the battery module.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A battery module, comprising:

a plurality of battery cell assemblies having a plurality of heat exchangers therein; and a first rubber cooling manifold configured to route a fluid into the plurality of heat exchangers, the first rubber cooling manifold having a first tubular member, a first inlet port, a first plurality of outlet ports, and first and second end caps;

the first tubular member extending parallel to a bottom side of the plurality of battery cell assemblies, the first tubular member having a first end and a second end;

the first end cap having a tubular portion and a wall, the wall of the first end cap being coupled to and enclosing an end of the tubular portion of the first end cap, the first end cap being coupled to the first end of the first tubular member such that the wall of the first end cap is disposed across an aperture of the first end to prevent the fluid from exiting the first end;

the second end cap having a tubular portion and a wall, the wall of the second end cap being coupled to and enclosing an end of the tubular portion of the second end cap, the second end cap being coupled to the second end of the first tubular member such that the wall of the second end cap is disposed across an aperture of the second end to prevent the fluid from exiting the second end;

the first inlet port being disposed on a top portion of the first tubular member and being further disposed substantially equidistant from the first end and the second end of the first tubular member, the first inlet port configured to induce the fluid to flow through a top of the first inlet port in a direction toward the bottom side of the plurality of battery cell assemblies as the fluid flows through the first inlet port, the first fluid port routing the fluid into an interior region of the first tubular member; and the first plurality of outlet ports being disposed collinearly and longitudinally along an outer surface of the first tubular member and spaced apart from one another, each of the first plurality of outlet ports further disposed below the first inlet port in a direction extending from a top side of the plurality of battery cell assemblies toward the bottom side of the plurality of battery cell assemblies, the first plurality of outlet ports extending outwardly from the outer surface of the first tubular member and in a direction parallel to the bottom side of the plurality of battery cell assemblies, a size of an aperture in the first inlet port being larger than a size of each aperture in each respective outlet port of the first plurality of outlet ports, the first plurality of outlet ports routing the fluid from the first tubular member into the plurality of heat exchangers for cooling the plurality of battery cell assemblies, each respective outlet port of the first plurality of outlet ports being sized to shaped to receive a respective port of the plurality of heat exchangers therein, each respective port of the plurality of heat exchangers extending completely through each respective outlet port of the first plurality of outlet ports and into the interior region of the first tubular member.

2. The battery module of claim 1, further comprising:

a second rubber cooling manifold configured to receive the fluid from the plurality of heat exchangers, the second rubber cooling manifold having a second tubular member, a first outlet port, a second plurality of inlet ports, and third and fourth end caps;

the second tubular member extending parallel to the bottom side of the plurality of battery cell assemblies;

the third end cap being coupled to a first end of the second tubular member, the fourth end cap being coupled to a second end of the second tubular member;

the second plurality of inlet ports being disposed collinearly and longitudinally along an outer surface of the second tubular member and spaced apart from one another, each of the second plurality of inlet ports further disposed below the first outlet port in the direction extending from the top side of the plurality of battery cell assemblies toward the bottom side of the plurality of battery cell assemblies, the second plurality of inlet ports extending outwardly from the outer surface of the second tubular member and in a direction parallel to the bottom side of the plurality of battery cell assemblies;

the second plurality of inlet ports receiving the fluid from the plurality of heat exchangers and routing the fluid into the second tubular member; and the first outlet port being disposed on a top portion of the second tubular member and routing the fluid out of the second tubular member.

3. The battery module of claim 2, wherein the first rubber cooling manifold is disposed adjacent to a first side of the plurality of battery cell assemblies, and the second rubber cooling manifold is disposed adjacent to a second side of the plurality of battery cell assemblies.

4. The battery module of claim 3, wherein the first side is disposed opposite to the second side.

5. The battery module of claim 1, wherein each respective port of the plurality of heat exchangers extends outwardly from the plurality of battery cell assemblies.

6. The battery module of claim 1, wherein the wall of the first end cap completely encloses the aperture of the first end of the first tubular member.

7. The battery module of claim 1, wherein the wall of the first end cap completely encloses the end of the tubular portion of the first end cap.

8. The battery module of claim 1, wherein each respective port of the plurality of heat exchangers has a flanged end portion that abuts against an inner surface of the first tubular member.

9. The battery module of claim 1, wherein the first tubular member having a cross-section profile with a substantially C-shaped wall portion and a substantially flat wall portion coupled to the substantially C-shaped wall portion, the first plurality of outlet ports being coupled to and extending outwardly from the substantially flat wall portion, the first inlet port being coupled to and extending outwardly from the substantially C-shaped wall portion.

10. A battery module, comprising:

a plurality of battery cell assemblies having a plurality of heat exchangers therein;

a first rubber cooling manifold configured to route a fluid into the plurality of heat exchangers, the first rubber cooling manifold having a first tubular member, a first inlet port, a first plurality of outlet ports, and first and second end caps;

the first tubular member extending parallel to a bottom side of the plurality of battery cell assemblies, the first tubular member having a first end and a second end;

the first end cap having a tubular portion and a wall, the wall of the first end cap being coupled to and enclosing an end of the tubular portion of the first end cap, the first end cap being coupled to the first end of the first tubular member such that the wall of the first end cap is disposed across an aperture of the first end to prevent the fluid from exiting the first end;

the second end cap having a tubular portion and a wall, the wall of the second end cap being coupled to and enclosing an end of the tubular portion of the second end cap, the second end cap being coupled to the second end of the first tubular member such that the wall of the second end cap is disposed across an aperture of the second end to prevent the fluid from exiting the second end;

the first inlet port being disposed on a top of the first tubular member, the first inlet port configured to induce the fluid to flow through a top of the first inlet port in a direction toward the bottom side of the plurality of battery cell assemblies as the fluid flows through the first inlet port, the first fluid port routing the fluid into an interior region of the first tubular member;

the first plurality of outlet ports being disposed collinearly and longitudinally along an outer surface of the first tubular member and spaced apart from one another, the first plurality of outlet ports further disposed below the first inlet port in a direction extending from a top side of the plurality of battery cell assemblies toward the bottom side of the plurality of battery cell assemblies, a size of an aperture in the first inlet port being larger than a size of each aperture in each respective outlet port of the first plurality of outlet ports, the first plurality of outlet ports extending outwardly from the outer surface of the first tubular member, the first plurality of outlet ports routing the fluid from the first tubular member into the plurality of heat exchangers for cooling the plurality of battery cell assemblies, each respective outlet port of the first plurality of outlet ports being sized and shaped to receive a respective port of the plurality of heat exchangers therein, each respective port of the plurality of heat exchangers extending through each respective outlet port of the first plurality of outlet ports and into the interior region of the first tubular member; and a second rubber cooling manifold configured to receive the fluid from the plurality of heat exchangers, the first rubber cooling manifold being disposed adjacent to a first side of the plurality of battery cell assemblies, and the second rubber cooling manifold being disposed adjacent to a second side of the plurality of battery cell assemblies.

11. The battery module of claim 10, wherein the first side is disposed opposite to the second side.

12. The battery module of claim 10, wherein each respective port of the plurality of heat exchangers extends outwardly from the plurality of battery cell assemblies.

13. The battery module of claim 10, wherein the wall of the first end cap completely encloses the aperture of the first end of the first tubular member.

14. The battery module of claim 10, wherein the wall of the first end cap completely encloses the end of the tubular portion of the first end cap.

15. The battery module of claim 10, wherein each respective port of the plurality of heat exchangers has a flanged end portion that abuts against an inner surface of the first tubular member.

16. The battery module of claim 10, wherein the first tubular member having a cross-section profile with a substantially C-shaped wall portion and a substantially flat wall portion coupled to the substantially C-shaped wall portion, the first plurality of outlet ports being coupled to and extending outwardly from the substantially flat wall portion, the first inlet port being coupled to and extending outwardly from the substantially C-shaped wall portion.

17. The battery module of claim 10, wherein the first inlet port is disposed substantially equidistant from the first end and the second end of the first tubular member.

\* \* \* \* \*